United States Patent
Ragireddy et al.

(10) Patent No.: US 7,360,083 B1
(45) Date of Patent: Apr. 15, 2008

(54) METHOD AND SYSTEM FOR PROVIDING END-TO-END SECURITY SOLUTIONS TO AID PROTOCOL ACCELERATION OVER NETWORKS USING SELECTIVE LAYER ENCRYPTION

(76) Inventors: Krishna Ragireddy, Encore Networks, Inc., 45742 Holiday Dr., Dulles, VA (US) 20166; Colin Roper, 45472 Holiday Dr., Dulles, VA (US) 20166; William Uhlig, 45472 Holiday Dr., Dulles, VA (US) 20166

( * ) Notice: Subject to any disclaimer, the term of this patent is extended or adjusted under 35 U.S.C. 154(b) by 301 days.

(21) Appl. No.: 11/067,559

(22) Filed: Feb. 28, 2005

Related U.S. Application Data (60) Provisional application No. 60/547,587, filed on Feb. 26, 2004.

(51) Int. Cl.
H04L 29/00 (2006.01)
(52) U.S. Cl. .................................................... 713/160
(58) Field of Classification Search ................ 713/160
See application file for complete search history.

(56) References Cited

U.S. PATENT DOCUMENTS

| | | | |
|---|---|---|---|
| 5,442,708 A * | 8/1995 | Adams et al. | 713/153 |
| 6,438,612 B1 * | 8/2002 | Ylonen et al. | 709/249 |
| 6,988,199 B2 * | 1/2006 | Toh et al. | 713/170 |
| 2003/0123481 A1 | 7/2003 | Neale et al. | |
| 2003/0147403 A1 | 8/2003 | Border et al. | |
| 2003/0172264 A1 | 9/2003 | Dillon | |
| 2003/0177395 A1 | 9/2003 | Pardee et al. | |
| 2003/0219022 A1 | 11/2003 | Dillon et al. | |

OTHER PUBLICATIONS

Yongguang Zhang "A Multilayer IP Security Protocol for TCP Performance Enhancement in Wireless Networks" IEEEE Journal on Selected Areas in Communications, May 4, 2004, pp. 767776, vol. 22.

* cited by examiner

*Primary Examiner*—Kambiz Zand
*Assistant Examiner*—Andrew L Nalven
(74) *Attorney, Agent, or Firm*—Dickstein Shapiro LLP (57) ABSTRACT

The present invention is a method, system, and computer program that provides secure network communication over a network between a first and a second entity wherein data packets are encrypted and transmitted according to previously exchanged encryption command information and wherein TCP accelerators may be used to effectively accelerate the transmission of the data packets. A method, system, and computer program are also shown that provide secure network communication through encrypting a plurality of payloads and embedding encryption command information for each encrypted payload into an options field of a corresponding protocol header while still allowing TCP accelerators to read the protocol headers and effectively accelerate the transmission of the payloads.

58 Claims, 9 Drawing Sheets

METHOD AND SYSTEM FOR PROVIDING END-TO-END SECURITY SOLUTIONS TO AID PROTOCOL ACCELERATION OVER NETWORKS USING SELECTIVE LAYER ENCRYPTION

CROSS-REFERENCE TO RELATED APPLICATION

This application claims the benefit of U.S. Provisional Application No. 60/547,587, entitled METHOD FOR PROVIDING END-TO-END SECURITY SOLUTIONS OVER SATELLITE NETWORKS USING SELECTIVE LAYER ENCRYPTION, filed Feb. 26, 2004, the entire disclosure of which is incorporated herein by reference.

FIELD OF THE INVENTION

The present invention generally relates to satellite networks and other communications media that display high latency, and more particularly to methods for securing end-to-end virtual private network communication across any such high-latency networks.

BACKGROUND OF THE INVENTION

Any transmission medium or network requires a finite time to carry a message from source to destination. The speed of light over a direct path determines the theoretical minimum transmission time. Also, all transmission equipment introduce additional delay, called latency. For example, although satellite networks have advantages such as permitting telecommunication across any distance without laying ground lines, the distance between the ground and the satellite introduces significant transmission delay. As another example, cellular wireless networks contain many packet switches, each of which introduces some latency; the cumulative delay can exceed that of a satellite link. Intercontinental terrestrial networks for packet data also display larger than desired latency.

Consider first the issue of latency generated within satellite networks. Most satellite networks have the following components: a hub (i.e., the main ground station), one or more satellites, and remote ground stations. Any location may be referred to as a "node." Geosynchronous-orbit satellites (i.e., satellites that maintain the same position above a geographic point on the earth's surface) orbit at about 22,300 miles (about 35,900 km) above the earth's surface. At each ground node, communications are facilitated by a satellite modem which formats data for upward transmission to a satellite, and receives down transmissions of information at any location that has a satellite dish.

As a result of the distance traveled by transmissions from one node (e.g., a ground station) to another node via a satellite, significant transmission delays may be incurred. That is, satellite networks have inherent round-trip delay characteristics of about ½ second for a typical geo-stationary satellite circuit. Such delay causes certain performance issues for voice applications. For example, problems such as "conversation collisions" occur wherein both parties start talking at the same time because neither can hear that the other party is also talking. Data protocols within satellite and other high-latency networks also face problems with long delays. Two problems in particular handicap the use of satellite networks for data applications: throughput limitation and partial security.

Throughput limitation refers to the fact that Transmission Control Protocol (TCP) sending devices (among many devices that transmit data packets) cannot transmit at rates in excess of the rates at which the receiver device can acknowledge receipt of the packets. In essence, satellite latency effectively caps standard TCP throughput per session, regardless of the bandwidth available.

In general network data communications, data packets are transmitted with accompanying control headers. The TCP header follows the Internet Protocol (IP) header. Higher layer protocols ride on TCP (that is, their headers follow the TCP header in the IP packet). In general, most protocols that desire guaranteed delivery rely on TCP; such protocols include HTTP, telnet, and FTP.

TCP was designed for error detection, error correction via retransmission, and congestion avoidance and recovery via a flow control mechanism that reduces throughput over high-latency networks. TCP is the connection-oriented transport protocol that operates end-to-end to ensure accurate delivery of data. This is in contrast with IP, the connectionless network protocol, which simply delivers packets, or datagrams, on a best-effort basis.

Figure 1:
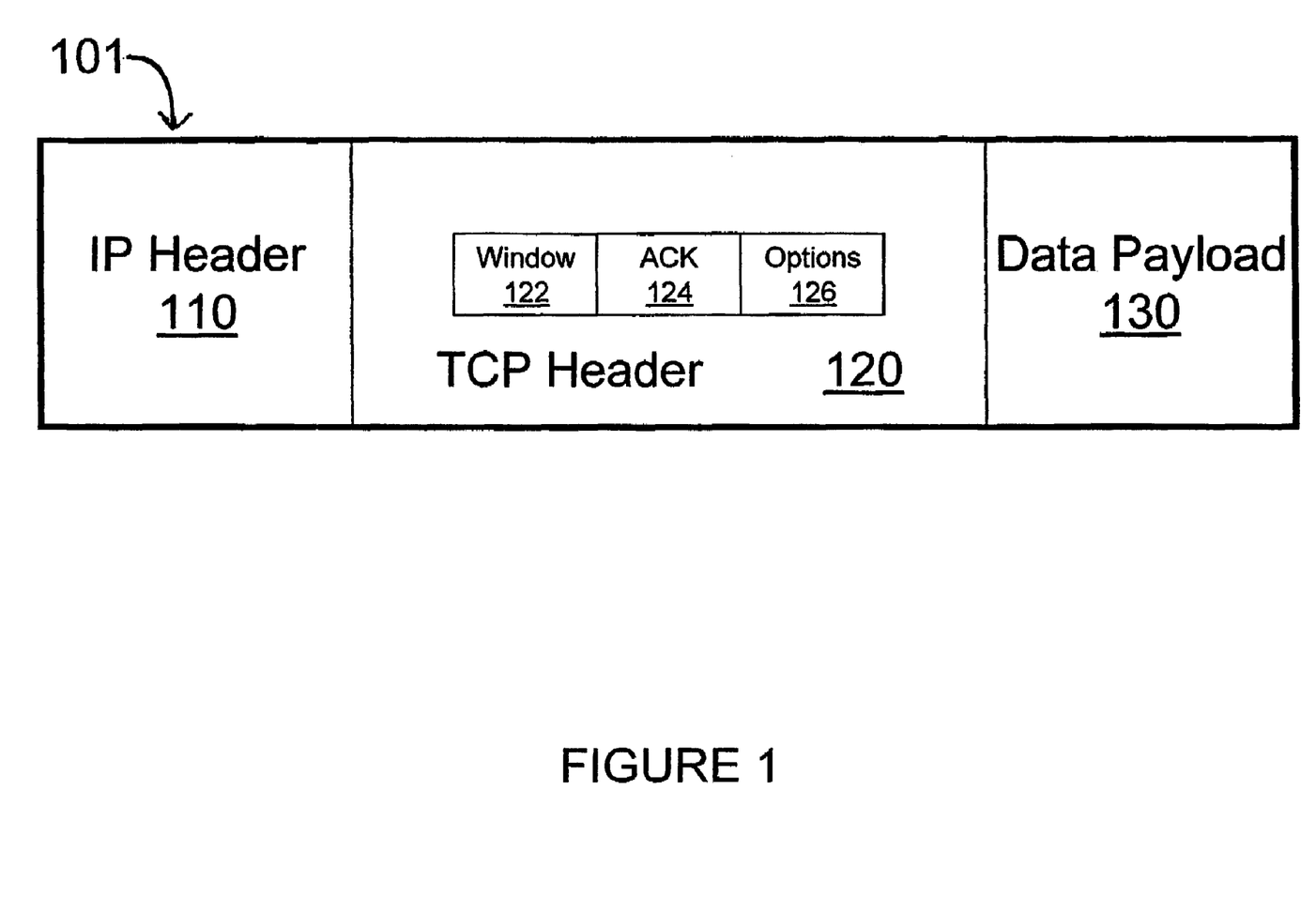
FIG. 1 is a representation of a standard TCP data packet.

With reference to FIG. 1, a standard TCP data packet 101 is shown with relevant fields. The data packet 101 includes IP header 110, TCP header 120 and a data payload 130. Details pertaining to IP header 110 may be found in Request for Comment published by the Interact Engineering Task Force ("RFC") 791 (Internet Protocol); details pertaining to TCP header 120 may be found in RFC793 (TCP). The data payload 130 may contain additional higher layer application headers, such as HTTP, telnet and FTP header information. The TCP header 120 further includes various control fields. When a connection is established between two TCP devices, messages are exchanged between the TCP devices to synchronize the connection and establish a window size for data payload 130. Window sizes are exchanged in the Window field 122, and indicate a total amount of data that may be transmitted before a receiving TCP device must confirm the reception of the data via the Acknowledgement (ACK) field 124. An additional field of interest is the TCP Options field 126.

An advantage of using a TCP acknowledgement system is that by controlling the window size through adjustments of the Window field 122, each side of a TCP connection may control the rate at which it receives data. However, in a satellite network, the inherent delay caused by long-distance transmission results in each sending TCP device being required to wait idle for each acknowledgement. In practice, this forced wait limits the average transmission speed to approximately 130 kbit/s, regardless of the channel bandwidth of the satellite transmission. An additional problem is that a TCP device may misinterpret the inherently long delay as network congestion. As a result, transmission rates are automatically reduced through a modification algorithm which reduces the Window field 122 in the data packets sent. This algorithm implemented by TCP further reduces the efficiency of a channel impaired by high latency.

A second drawback in using satellite communication is low security. Transmissions from satellites are available to anyone with a suitable receiver. To deter interception, service providers routinely encrypt transmissions between satellite modems. However, hub earth stations are seldom at customer sites and so there will likely exist a terrestrial segment that is not protected by the satellite service provider. As a result, endpoint users of the transmission must create their own security or encryption.

Prior art solutions for each problem (i.e., throughput limitation and low security) do exist, but each have their own respective drawbacks.

Figure 2:
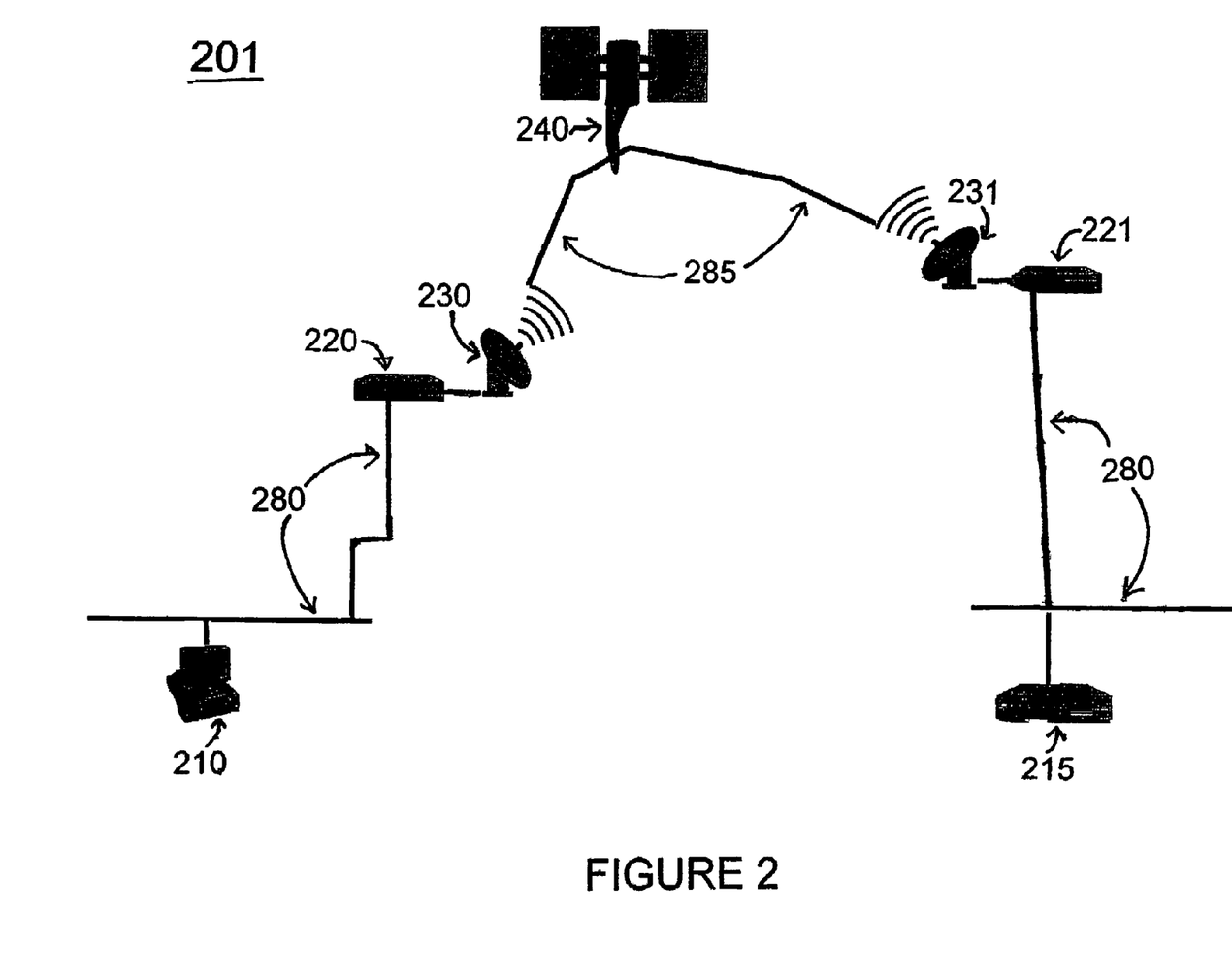
FIG. 2 is a satellite communication system.

One solution to the throughput limitation is shown in FIG. 2. FIG. 2 depicts a satellite communication system 201 that includes multiple TCP accelerators 220 and 221, such as performance enhancing proxies or PEP devices. PEP functionality can be built into a server or an RFC modem or other appropriate processor. A PEP device may be used to improve the performance of transmission protocols on networks where performance suffers due to the characteristics of the network (long delay and low channel reliability in satellites). In the satellite communication system 201, a source port 210 may establish a communication session with a destination port 215. TCP data packets are sent from the source port 210 to the destination port 215 via a satellite network 240. Satellite modems 230 and 231 act as terrestrial nodes for the satellite transmission. In this solution, a data packet sent from source port 210 will be intercepted by TCP accelerator 220. The TCP accelerator 220 then "spoofs" the protocol (for example, TCP) used by the endpoint. In other words, the TCP accelerator 220 acts as if it is the destination port 215, and itself sends ACK packets to the source port 210. The original data packet (with modified TCP header or with field values appropriate for the destination port 215) is then sent via the satellite network 240 to the TCP accelerator 221, from where it is reconverted into its original form and forwarded to the destination port 215. Because the idle periods incurred by waiting for an ACK signal are hereby minimized by the spoof, the use of TCP accelerators 220 and 221 allows standard protocols to deliver higher throughput through satellite network 240.

An important consideration when using the TCP accelerators 220 and 221 is that the two TCP accelerators 220 and 221 coordinate the TCP header fields to prevent the end points (i.e., the source port 210 and the destination port 215) from detecting the presence of the TCP accelerators 220 and 221 in the satellite (or other high-latency) connection. To accomplish this, this method must break the connection into three segments. The segment between the source port 210 and the TCP accelerator 220 will carry normal TCP sessions 280, i.e., communications involving data packets described by IP and TCP headers originating from the source port 210 and targeting the destination port 215. Similarly, the segment between the TCP accelerator 221 and the destination port 215 will also carry normal TCP sessions 280 (i.e., the IP and TCP headers will identify the source port 210 and the destination port 215). The segment between the two TCP accelerators 220 and 221 will carry modified or spoofed TCP sessions 285. The total circuit avoids the throughput limit by avoiding the limiting behavior of TCP over the high-latency segment carrying the spoofed TCP sessions 285.

There are several advantages of using TCP accelerators, such as PEPs. A proxy on the ground deals with its adjacent end point using standard TCP, so the customer device needs no modification. Prompt ACKs from the PEP give the sender permission to send more, even before the previous window of data reaches the far-end earth station. The customer can always send transmissions at the rate available on the LAN/WAN or other high-latency network, up to the capacity of the high-latency network. At the receiving end, the PEP appears to be a normal router. Over the satellite network, proxies take full advantage of the available bandwidth to achieve maximum throughput. PEPs may work with a larger TCP window, with a protocol that does not use windows and acknowledgments (e.g., User Data Protocol (UDP)), or any other mechanism.

However, the advantages of using TCP accelerators are minimized by the use of existing solutions to the partial security problem inherent to any satellite transmission. The partial security drawback of using satellite transmissions is often solved using virtual private networks, or VPNs. VPNs based on the widely-used IPsec ("IP Secure") protocol provide the most secure transmission generally available from endpoint to endpoint on IP networks. Only the VPN endpoints can decrypt the information. IPsec comes in two formats—Encapsulating Security Payload (ESP) and Authentication Header (AH).

Figure 3:
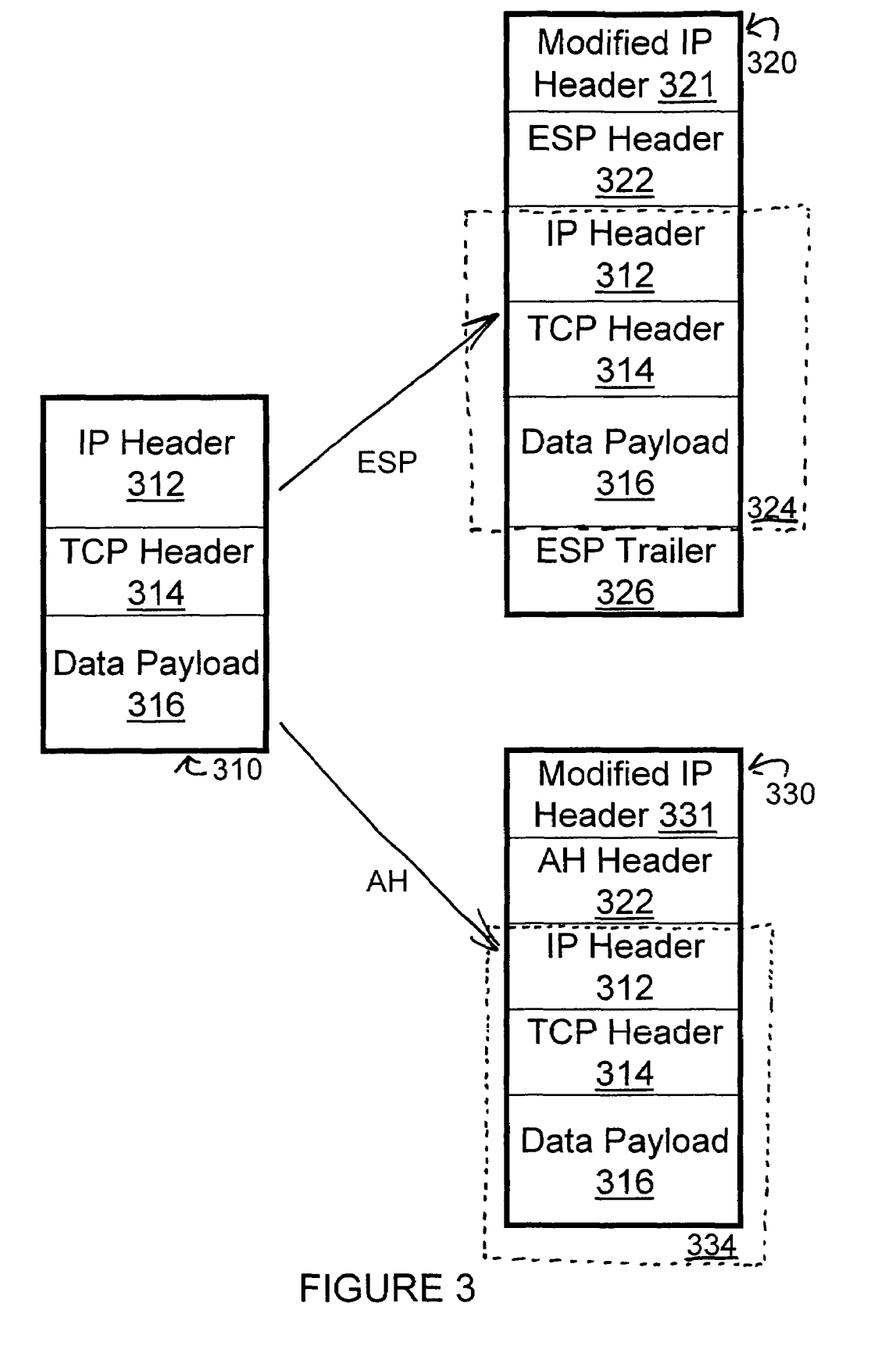
FIG. 3 a summary of the ESP and AH IPsec formats.

FIG. 3 summarizes the two IPsec formats. In FIG. 3, an unprotected data packet 310 contains an IP header 312, a TCP header 314 and a data payload 316. When IPsec ESP is applied, the entire data packet 310 is encrypted (the IP header 312, the TCP header 314 and the data payload 316). The resulting encrypted data packet 320 contains a new modified IP header 321, an IPsec ESP header 322, and then an encrypted region 324 that includes the IP header 312, TCP header 314 and the data payload 316. An ESP trailer 326 is also inserted. This total encryption, however prevents the PEP device from seeing or modifying the original TCP header 314 (specifically, the ACK and Window fields of the header), so these sessions cannot be accelerated by PEP devices. On the other hand, a data packet protected by the IPsec AH format does not encrypt the payload and instead leaves the TCP header visible. An AH protected data packet 330 includes a new modified 331, an IPsec AH header 332, the original IP header 312, the original TCP header 314 and the data payload 316. The IP header 312, the TCP header 314 and the data payload 316 are in an authentication-protected region 334 established by the authentication algorithms of the IPsec AH header 332. Any change in the protected TCP header (like those changes made by PEP devices) will result in a failure of the authentication process and a rejection of the protected packet. This also prevents acceleration by PEP.

A solution to the combined problem has been to allow PEPs to encrypt and decrypt data at the site of the PEP device. The result is that a PEP device that has just decrypted data will send unencrypted data to an IPsec router. Even though the IPsec router may be proximate to the PEP device, the existence of an "unencrypted six inches" on the cable between an IPsec router and a PEP is unacceptable to many enterprises and government agencies as they often require complete end-to-end confidentiality.

The result of these problems has been a conflict between maximizing throughput and maximizing high security using IPsec VPNs. In summary, standard IPsec cannot be accelerated by PEP devices; the additional processing time to encrypt/decrypt (and compress/decompress) further lengthens the ACK cycle, cutting throughput and reducing security.

Accordingly, there exists a significant need for a full secure network that provides high performance transmission.

BRIEF SUMMARY OF THE INVENTION

In view of the foregoing need, the present invention provides a system and method that enables secure network communication over a network exhibiting a degree of latency between a first and a second entity.

In one embodiment of the invention, a method comprises the steps of establishing a communication link between first and second routers, initializing a communication session between the first and second entities via the communication link, wherein encryption command information for the communication session is exchanged, and selectively encrypting a plurality of data payloads contained in a corresponding plurality of data packets transferred during the communication session, wherein each of the plurality of encrypted data payloads is encrypted according to the encryption command information exchanged during the initializing step.

In another embodiment of the present invention, a method of providing secure network communication over a network exhibiting latency between a first and a second entity is shown, wherein both first and second entities have respective first and second selective layer encryption devices. In this embodiment, the method comprises the steps of sending a plurality of data packets between the first entity and the first selective layer encryption device, encrypting each of a plurality of payloads carried by the plurality of data packets, said encrypting occurring at the site of the first selective layer encryption device, embedding an encryption command information into a plurality of protocol headers carried by the plurality of data packets, transmitting each of the plurality of encrypted data packets from the first selective layer encryption device to the second selective layer encryption device, and extracting the encryption command information from the plurality of protocol headers, said extraction occurring at the site of the second selective layer encryption device.

In yet another embodiment of the present invention, a system for providing secure network communication over a network exhibiting latency is shown. In this embodiment, communication between a first and a second entity is facilitated by a first and a second router, the first router configured to initialize a communication session between the first and second entities and to exchange encryption command information once per communication session, and wherein the first router is configured to selectively encrypt each of a plurality of data payloads contained in a corresponding plurality of data packets according to the encryption command information.

In still another embodiment of the present invention, a system for providing secure network communication over a network exhibiting latency is shown. In this embodiment, communication between a first and a second entity is facilitated by a first and a second selective layer encryption device, wherein the first selective layer encryption device is configured to encrypt each of a plurality of payloads carried by a corresponding plurality of data packets and embed an encryption command information into a plurality of protocol headers carried by the corresponding plurality of data packets.

In a further embodiment of the present invention, a computer program product designed to be run on a computer is shown. The computer program product comprises a computer useable medium upon which computer program logic is recorded. The computer program logic is configured to initialize a communication session by embedding encryption control information into an options field of a protocol header of an initial data packet, and to encrypt each of a plurality of subsequent data packets, wherein each of the plurality of encrypted subsequent data packets includes a corresponding plurality of protocol headers that do not carry encryption control information.

In yet another embodiment of the present invention, a computer program product designed to be run on a computer is shown. The computer program product comprises a computer useable medium upon which computer program logic is recorded. The computer program logic is configured to encrypt each of a plurality of data payloads within a corresponding plurality of data packets, and to embed encryption control information into an options field of each of a plurality of protocol headers.

In still a further embodiment of the present invention, a device for providing secure network communication is shown. The device is configured to encrypt each of a plurality of data packets, wherein the device may be selectively configured to embed encryption command information into an options field of at least one protocol header.

BRIEF DESCRIPTION OF THE DRAWINGS

Further features and advantages of the present invention as well as the structure and operation of various embodiments of the present invention are described in detail below with reference to the accompanying drawings.

DETAILED DESCRIPTION OF THE INVENTION

The present invention is now described in more detail herein in terms of various exemplary embodiments. This is for convenience only and is not intended to limit the application of the present invention. In fact, after reading the following description, it will be apparent to one skilled in the relevant art(s) how to implement the following invention in alternative embodiments. Moreover, the present invention can be implemented using software, hardware or any combination thereof as is known to one of ordinary skill in the art.

The present invention meets the above-identified needs for simultaneous high throughput and encryption by providing a system, method, and computer program product for Selective Layer Encryption (SLE) within all networks that experience some degree of latency. Such networks can include, but are not limited to satellite communications, cellular data service, terrestrial networks that experience some degree of signal latency such as the Internet, a radio link to a space vehicle, or any other television, microwave, or low-frequency radio connection. The present invention allows current PEP acceleration techniques to access the TCP header, and yet still provides end-to-end IPsec-based security between two endpoints. That is, SLE of the present invention, preserves the authentication and encryption integrity of the IP VPNs, yet allows TCP acceleration or other protocol spoofing over portions of the connection.

The invention takes its name, Selective Layer Encryption, from the ability of an SLE device, as described below, to choose which protocol layers (or headers) within a data packet should be encrypted and which should remain unencrypted. A complementary ability of SLE is to place the control channel in a position within the packet to ensure interoperability with the main network and/or to enhance security by encrypting control information. In one embodiment, the SLE-VPN mode is provided which avoids an increase in the packet size by maintaining the state of the connection in the end point SLE routers.

Figure 4:
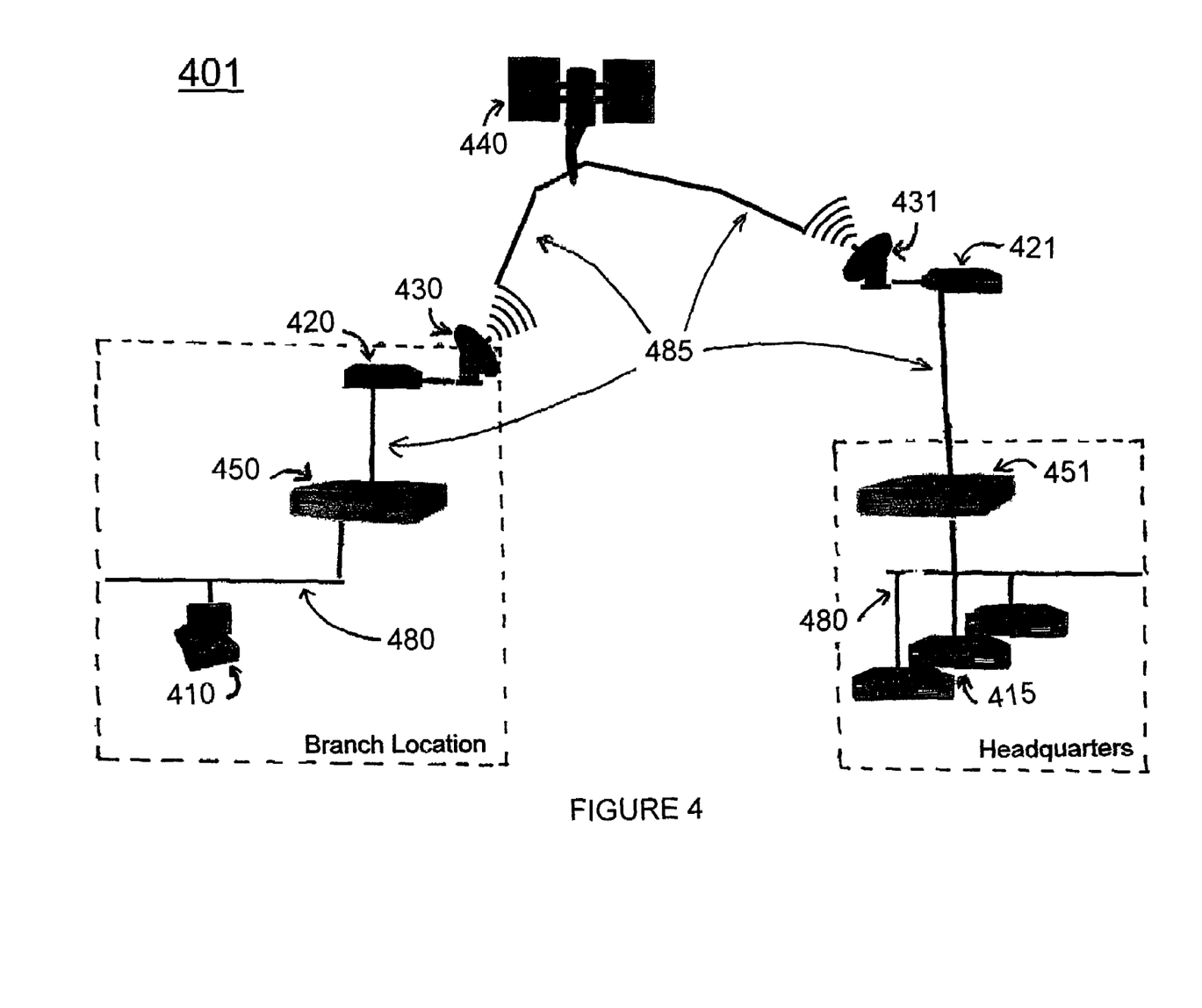
FIG. 4 is an SLE-VPN enabled satellite communication system, in an exemplary embodiment of the present invention.

FIG. 4 depicts a satellite communication system 401 in an exemplary embodiment of the present invention. In this embodiment, the SLE of the present invention is implemented within SLE-VPN routers 450 and 451, located at the end points of secure connections, typically on the premises of the network user. The SLE-VPN routers 450 and 451 are actually VPN routers with an SLE device or capability built in, and will be referred to as both SLE-VPN routers and SLE devices. However, any suitable software or hardware can be used at a suitable location. Typically, the SLE devices 450 and 451 will establish a communication session, for example a TCP connection, between themselves. However, the invention may be applied to other protocols, besides TCP, that are sensitive to delay. The overall connection may be divided into three segments. The segment between the source port 410 and the SLE device 450 and the segment between the SLE device 451 and the destination port 415 will carry normal TCP sessions 480. The segment between the two SLE devices 450 and 451, including the PEPs 420 and 421, the satellite modems 430 and 431 and the satellite network 440, will carry SLE sessions 485. Other topologies are readily imagined. For instance, the satellite network 440 may be implemented by a cellular data network, any terrestrial network that experiences some degree of signal latency such as the Internet, a radio link to a space vehicle, or any other television, microwave, or low-frequency radio network, or any combination thereof.

In the first embodiment, SLE-VPN, the SLE endpoint devices 450 and 451 maintain the logical context or "state" of the connections between the two end points (the source port 410 and the destination port 415), starting with the two SLE devices communicating with each other to generate encryption keys, for example via the Internet Key Exchange (IKE) protocol. By maintaining a knowledge of the state of each connection, the SLE devices 450 and 451 avoid the need for each packet to carry information necessary to identify the packet format, with the result that "SLE-VPN packets" carry no additional overhead bytes, conform to all IP standards, are compatible with all IP networks, and permit acceleration by Performance Enhancement Proxies 420 and 421. After initialization, each new connection, set up between the same devices, references the established keys shared by that pair of devices, producing a different encryption key for each new connection, for example each TCP session, without the overhead or processing for the IKE protocol.

An SLE session begins when the SLE devices 450 and 451 establish a standard IPsec tunnel connection between them. Alternatively, other appropriate encryption protocols may also be established. The SLE devices 450 and 451 confirm the mutual use of the SLE-VPN for communication between the end-user devices (i.e., source port 410 and destination port 415) using the IPsec connection or other encryption protocols. All communication between the SLE devices is encrypted.

When a user device, or source port 410 (for example, a branch office PC) desires a connection across the network, it sends a connection request (for example a TCP SYN packet) to the IP address of the target device or destination port 415 (for example the server at headquarters). The SLE device 450 sends the original TCP/IP header information and encryption parameters over the IPsec tunnel. Then, based on a user selection, the SLE device 450 may either use an existing TCP session between SLE devices 450 and 451 or establish a new TCP session. The SLE device 450 at the branch office acknowledges the packet and terminates the TCP session 480 with the user's PC, the source port 410. The SLE device 450 at the branch then sends a connection request to the SLE device 451 at headquarters. This request contains the original destination IP address of the headquarters server (the destination port 415), the original TCP port numbers, and a random initialization vector (IV). If this portion of the path is on public networks, the outermost IP addresses must be in the range of officially assigned numbers, or public addresses. The SLE routers 450 and 451 insert their own IP addresses in the outermost IP header and map the user's TCP port numbers to arbitrary values that allow many user connections to share the SLE tunnel.

The headquarters SLE device 451 uses the connection request in several ways. The SLE device 451 creates a table entry for the connection, containing the original destination IP address and TCP port number. Instructed by the connection request, the headquarters SLE device 451 then sets up a TCP connection with the target user device or destination port 415, the server at headquarters.

In processing data sent between the source port 410 and the destination port 415, each SLE router 450 and 451 recognizes this transmission as an encrypted session. Before sending a packet, the SLE router encrypts the data payload using IPsec format and any selected encryption algorithm that produces an encrypted form that is no longer than the original. The encrypted content is then placed in the data payload and padded if necessary so that the packet-length information in the IP header is not affected.

IP addresses for the private segments may be private, for example of the form 10.x.x.x or 192.168.x.x, or these IP addresses may be public. By mapping any range of IP addresses and port numbers on the private segments to arbitrarily assigned public IP addresses on the public segment, this invention permits an organization to use the private IP address ranges, for example 192.168.x.x, 10.x.x.x at all branch offices, and also at headquarters, without conflict or the need for an additional device to perform Network Address Translation (NAT). This ability creates highly flexible Virtual Private Networks (VPNs) on any IP network and simplifies the assignment of IP addresses within an organization. Both public and private IP addresses, as well as the original TCP ports of the private segments, are hidden from the public network by this address mapping.

All of the IP packets sent by the SLE-VPN routers 450 and 451 are in standard IP format, with visible TCP fields that reflect a normal connection between the SLE devices 450 and 451. Consequently, IP packets carrying the TCP protocol are accelerated by the PEPs 420 and 421, even when their payloads are encrypted. Manipulation of the TCP fields by the PEPs 420 and 421 has no effect, other than to increase the throughput, on the separate TCP sessions maintained locally on the private segments.

Figure 5:
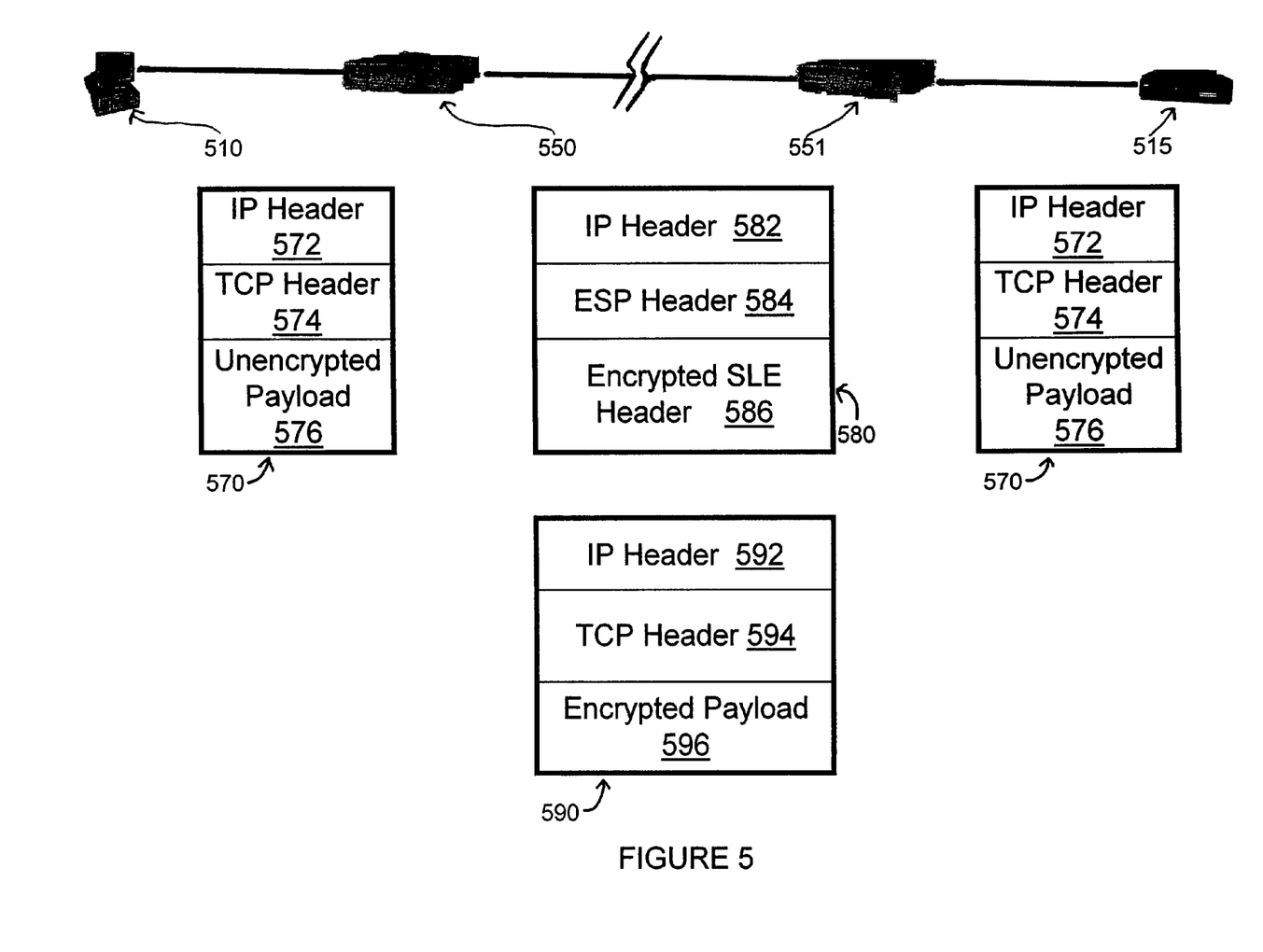
FIG. 5 is a summary of the SLE-VPN header information, in an exemplary embodiment of the present invention.

FIG. 5 summarizes the SLE-VPN header information at various points along the communication network of the embodiment described in FIG. 4. In between the source port 510 and the SLE device 550, and in between the SLE device 551 and the destination port 515, the data packet 570 is normal and unchanged. The data packet 570 includes a normal IP header 572, a normal TCP header 574 and an unencrypted payload 576. However, data packets sent between the SLE devices 550 and 551 are encrypted as encrypted data packet 590. To establish the SLE-VPN connection, SLE device 550 sends an initial SLE connection request 580 containing SLE header information over the established IPsec tunnel. The initial SLE connection request 580 is an ESP/IP data packet. Initial SLE connection request 580 contains IP header 582, ESP header 584 and encrypted SLE header 586. The encrypted SLE header 586 includes the encryption information to be used for the entire SLE-VPN session, including information pertaining to the original IP and TCP headers 572 and 574, and modified IP and TCP headers 592 and 594 used on the encrypted data packet 590. The modified TCP header 594 is of standard TCP header format as defined in RFC793, containing modified port numbers as agreed upon by the SLE devices 550 and 551. Once the SLE connection establishment is complete (as evidenced by a return response in the format of the initial SLE connection request 580), the same SLE connection may be used for end-to-end TCP connections between source port 510 and destination port 515.

Once the SLE connection has been established between SLE devices 550 and 551, encrypted data packets 590 may be sent without any additional overhead from the SLE device 550 to the SLE device 551. These encrypted data packets 590 contain a normal, unencrypted IP header 592, a standard unencrypted TCP header 594 and an encrypted payload 596. No encryption control information is contained in the encrypted data packets 590, because this information has already been communicated once for the session during the SLE connection request 580.

Figure 6:
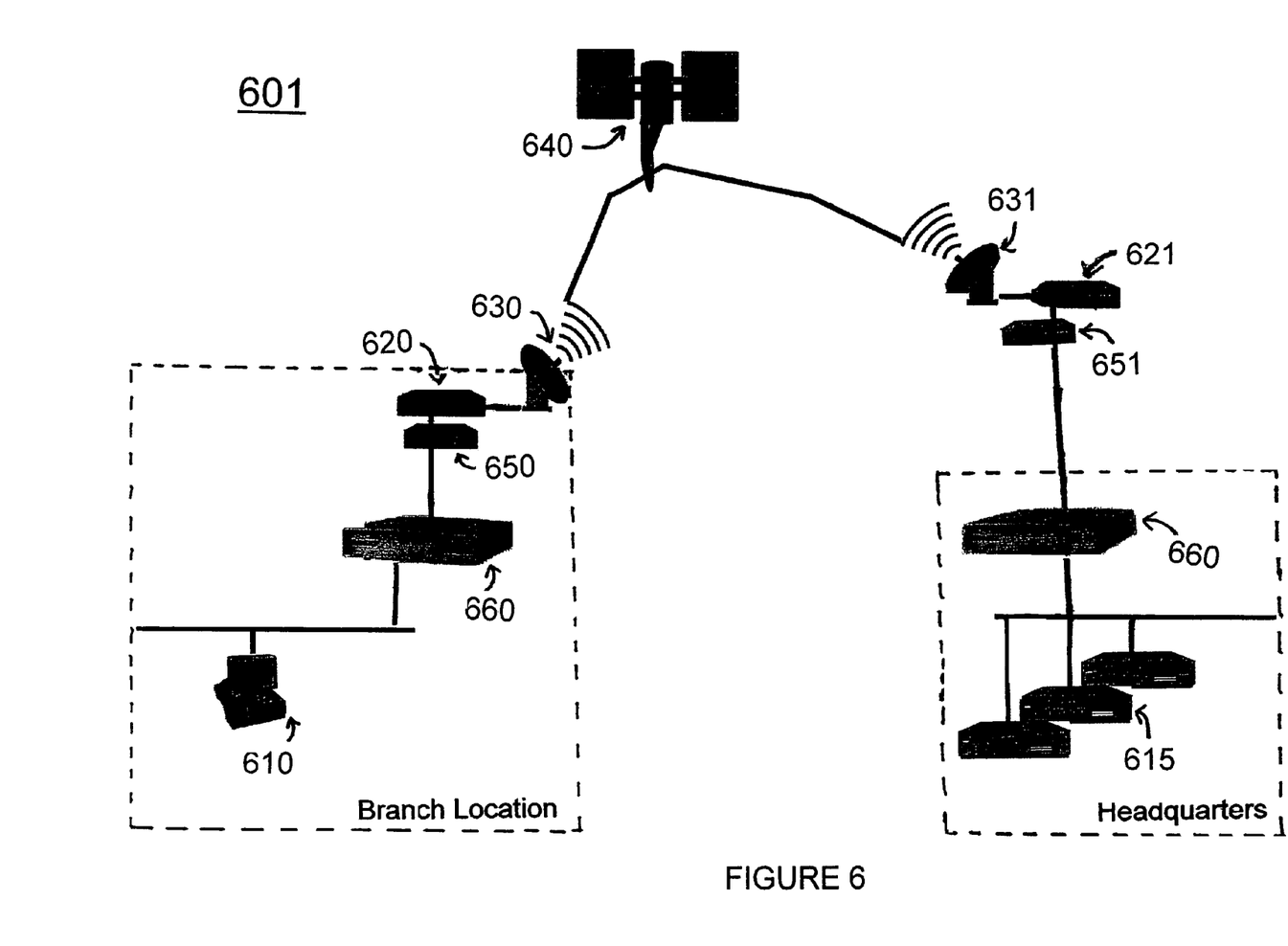
FIG. 6 is a satellite communication system, in an exemplary embodiment of the present invention.

In a further embodiment, the present invention allows a satellite or other network service provider to offer "all-in-one" security to its users by placing the SLE functionality adjacent to each satellite modem, either in a separate device or as software implemented on the same platform as the satellite equipment. FIG. 6 depicts a satellite communication system 601 as another exemplary embodiment of the present invention. In this embodiment, the SLE of the present invention is implemented within SLE-devices 650 and 651, located at the site of the PEPs 620 and 621 and satellite modems 630 and 631. The SLE devices 650 and 651 are separate from VPN routers 660 that may be used. Once again, the satellite communication network also includes a source port 610 and a destination port 615. The network is represented by a satellite network 640. Other topologies are readily imagined. For instance, the satellite network 640 may be implemented by a cellular data network, any terrestrial network that experiences some degree of signal latency such as the Internet, a radio link to a space vehicle, or any other television, microwave, or low-frequency radio network, or any combination thereof.

Over the standard encrypted PEP session maintained between PEPs 620 and 621, the SLE devices 650 and 651 establish SLE connections between the SLE devices 650 and 651 at the site of the respective satellite modems 630 and 631. With the PEP acceleration, the connection operates at high speed, taking full advantage of the capacity of the satellite circuit. From the SLE devices 650 and 651 (which may be incorporated into the PEPs 620 and 621) out to the user sites (i.e., the source port 610 and the destination port 615), either SLE or IPsec secure tunnels can be extended to provide end-to-end solutions.

In this embodiment, if the user's equipment employs standard IPsec, a satellite service provider can switch a connection between the SLE format on the satellite side of the SLE devices to standard IPsec format over the terrestrial connections—within the enclosure of the SLE device. The ability of the SLE device to encrypt at any protocol layer allows it to be compatible with both formats at the same time. As a result, at no time is unencrypted data accessible on a cable or on any physical port of the equipment. Ground transmission may be on leased lines or via an ISP.

In other embodiments of the invention, the SLE routers need not remember the encryption state, thus requiring that information about the connection be inserted in each packet. In still other embodiments, the encryption method may produce a larger payload than the original payload. In either situation, SLE offers additional modes wherein additional information is carried in an options field in either the IP or TCP header. The channel selected for this communication may depend on the capabilities of the network, as described below.

The SLE-TCP mode of operation allows a TCP options field to announce and control the handling of the encrypted information if the satellite modems preserve the integrity of TCP fields across the satellite link—not all do. That is, some satellite systems have PEPs that ignore the additional header length occupied by a TCP option field. On these systems, the receiver never sees the TCP option fields, and therefore cannot recognize encrypted data. SLE-TCP mode may be used, however, for those satellite systems that do not ignore the TCP options field.

Figure 7:
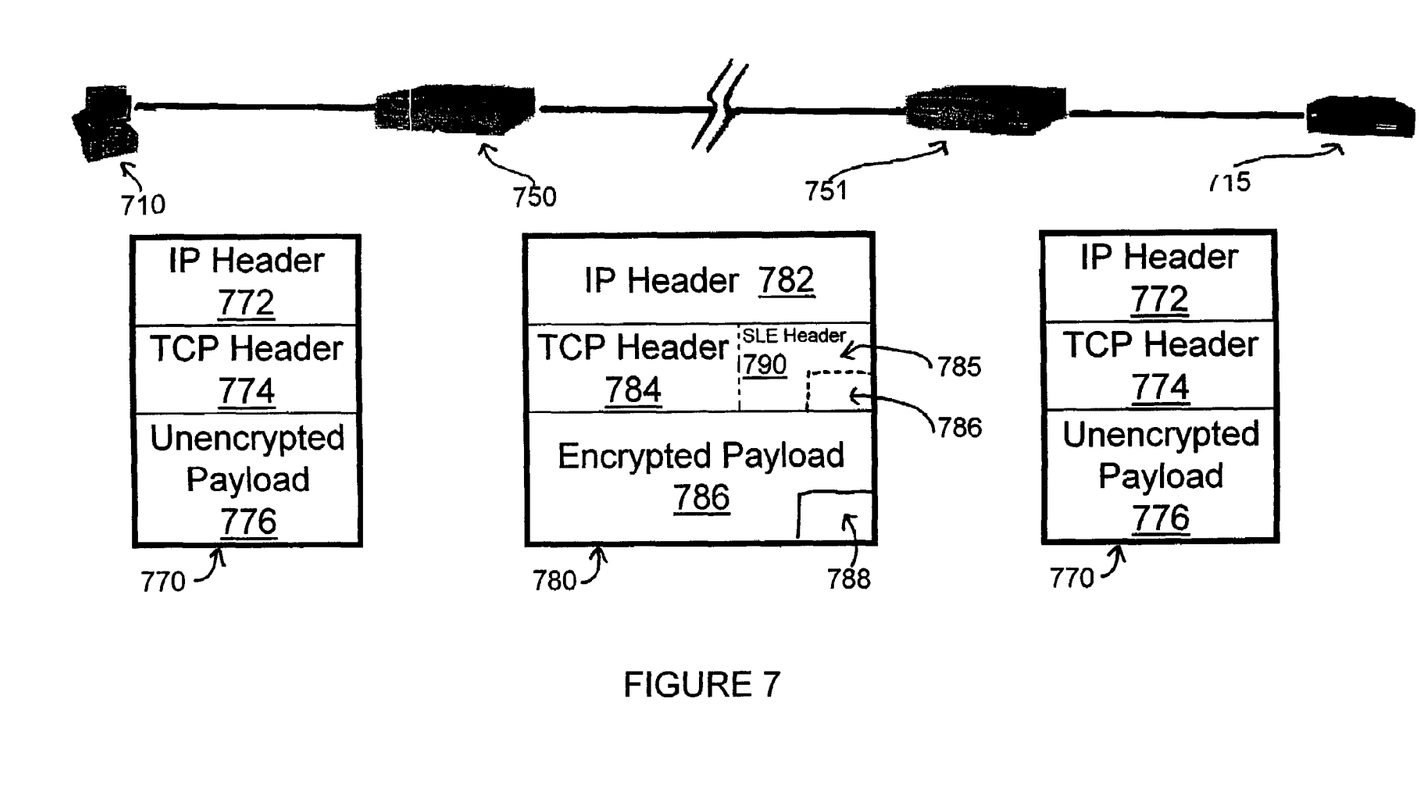
FIG. 7 is a summary of the SLE-TCP header information, in an exemplary embodiment of the present invention.

FIG. 7 summarizes the SLE-TCP mode. In between the source port 710 and the SLE device 750, and in between the SLE device 751 and the destination port 715, the data packet 770 is normal and unchanged. The data packet 770 includes a normal IP header 772, a normal TCP header 774 and an unencrypted payload 776. However, data packets sent between the SLE devices 750 and 751 are modified. In an example of these modified data packets 780, SLE is used to selectively place encryption control information in the form of an SLE header 790 into the TCP options field 785 of the TCP header 784. The modified data packet 780 also includes a normal IP header 782 and an encrypted payload 786. An authentication header or trailer 788 may also be included. Because the combined size of the encrypted payload 786 and the authentication header or trailer 788 will be larger than that of the original unencrypted payload 776, and in order to avoid modifying the length element of the TCP header 784, a portion of the encrypted payload 686 is shifted into the TCP options field 785 with the SLE header 790.

Another embodiment of the present invention includes using SLE to selectively encode the encryption control information into an IP options field. This mode functions for most satellite modems; satellite modems support IP options fields even when they do not support TCP options.

Figure 8:
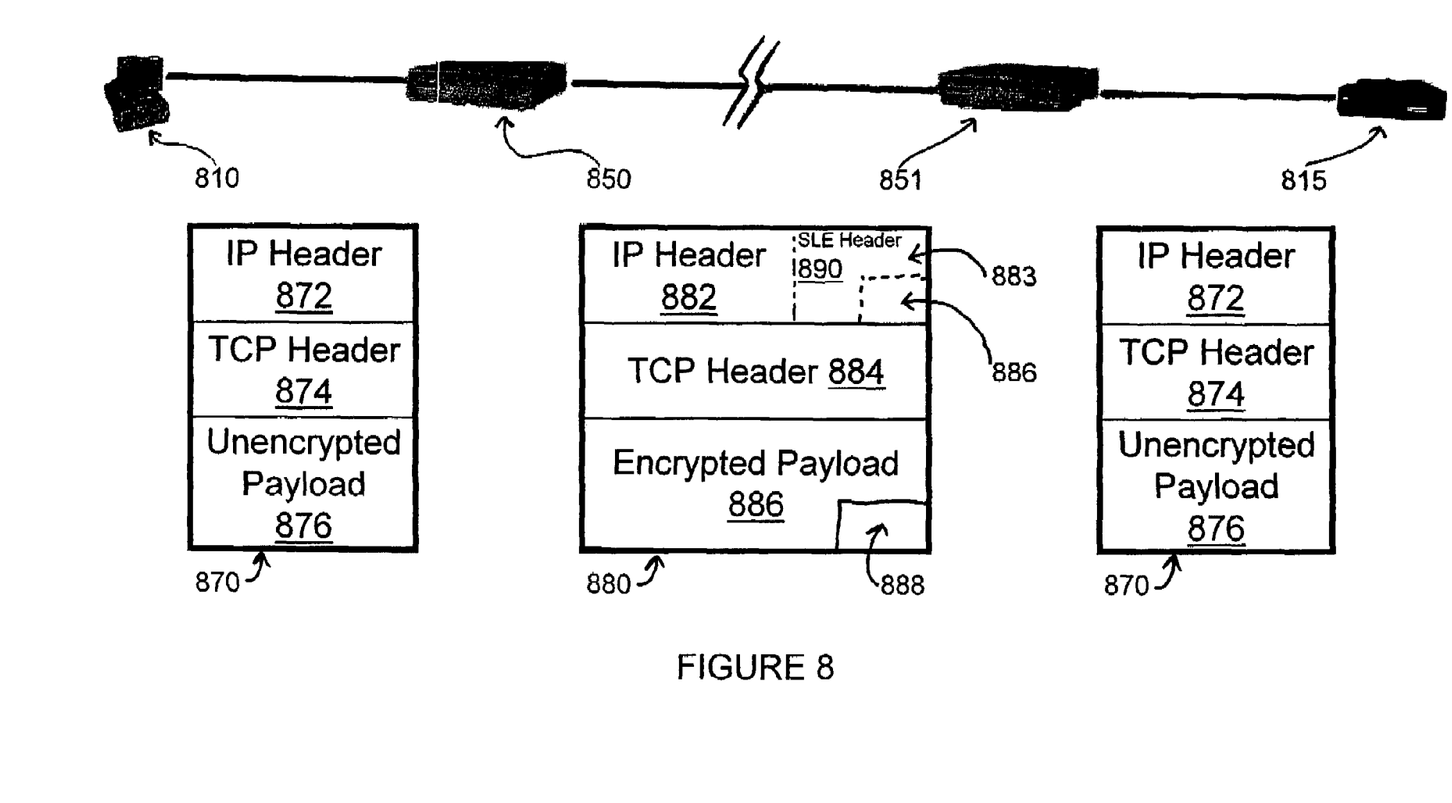
FIG. 8 is a summary of the SLE-IP header information, in an exemplary embodiment of the present invention; and,
FIG. 9 is a summary of the SLE-Transparent header information, in an exemplary embodiment of the present invention.

FIG. 8 summarizes the SLE-IP mode. In between the source port 810 and the SLE device 850, and in between the SLE device 851 and the destination port 815, the data packet 870 is normal and unchanged. The data packet 870 includes a normal IP header 872, a normal TCP header 874 and an unencrypted payload 876. However, data packets sent between the SLE devices 850 and 851 are modified. In an example of these modified data packets 880, SLE is used to selectively place encryption control information in the form of an SLE header 890 into the IP options field 883 of the IP header 882. The modified data packet 880 also includes a normal TCP header 884, an encrypted payload 886 and may include an authentication header or trailer 888. Because the combined size of the encrypted payload 886 and the authentication header or trailer 888 will be larger than that of the original unencrypted payload 876, and in order to avoid modifying the length element of the TCP header 884, a portion of the encrypted payload 886 is shifted into the IP options field 883 with the SLE header 890.

In either of these two modes, the control information is carried in an Option field. The SLE devices recognize this type of encrypted connection by the "type" value in the Options field.

Another embodiment of the invention combines a stateless SLE router with an encryption method that increases the length of the plain text message. The increase in the payload normally would require a change in the TCP header field that indicates payload size in the form of a sequence number. Such a change in header content could prevent acceleration by a PEP or could conflict with an authentication process: either case would prevent use of a larger payload. By moving the first portion of the encrypted payload, in an amount equal to the increase in size over the unencrypted payload, to an option field in the TCP header, the payload length of the IP packet is constant. An option field in the TCP header may be used similarly, to accommodate the addition of an authentication header as well as for an enlarged payload or for control information. However, the addition of SLE information in every packet increases the bandwidth requirement, compared to SLE-VPN mode, by as much as 40 bytes per packet.

Figure 9:
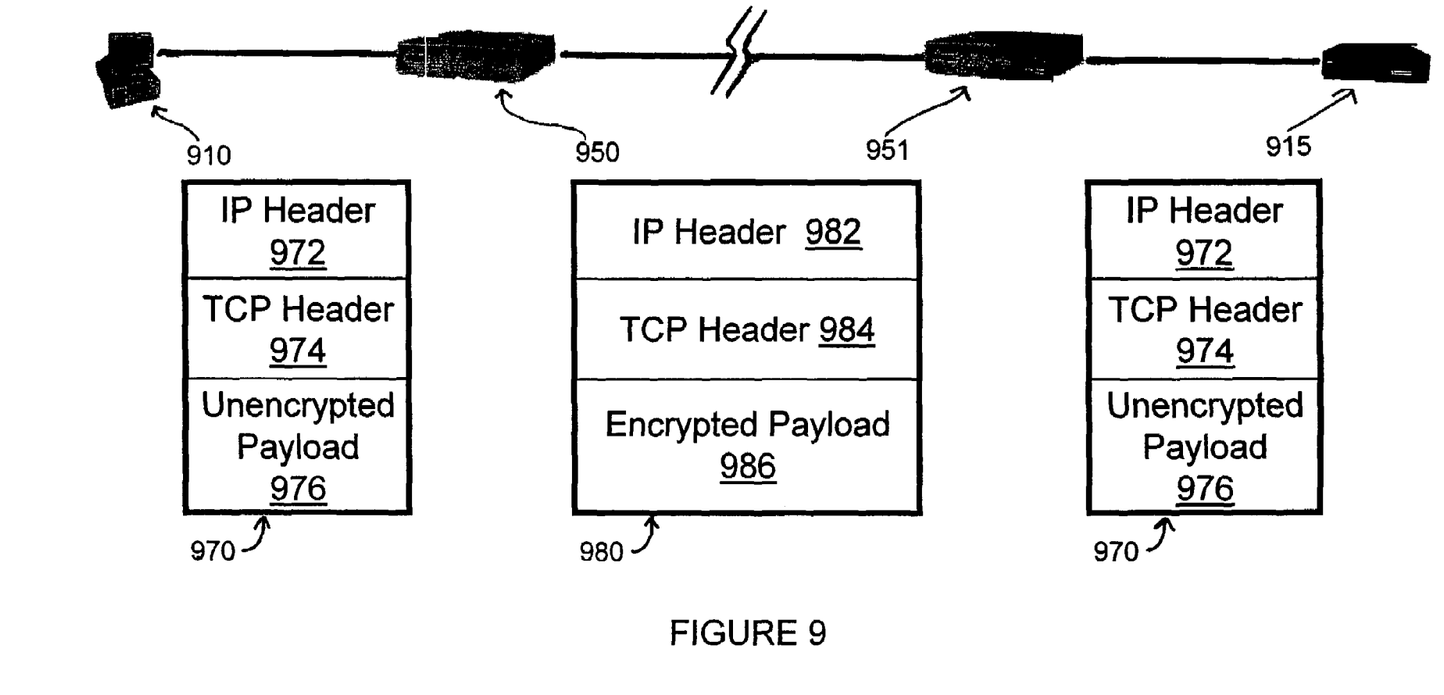

A further implementation is called SLE-Transparent. FIG. 9 summarizes the SLE-Transparent mode. In between the source port 910 and the SLE device 950, and in between the SLE device 951 and the destination port 915, the data packet 970 is normal and unchanged. The data packet 970 includes a normal IP header 972, an unencrypted payload 976 and may include a normal TCP header 974. Between the SLE devices 950 and 951, the modified data packets 980 are only modified to the degree that the payload has been encrypted. Hence, the modified data packets 980 include a normal IP header 982, an encrypted payload 976 and possibly a normal TCP header 984. No encryption command information is sent because the encryption command information is already known at the endpoints (i.e., the source port 910 and the destination port 915).

The goal of SLE is to provide robust data security solutions to IP networks. Implementations of SLE provide more flexibility compared to other industry standard schemes through SLE's ability to function at different protocol layers.

The present invention (or any part(s) or function(s) thereof) may be implemented using hardware, software, or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers, purpose built hardware with "embedded" software, hardware components such as application specific integrated circuits (ASICs), or similar devices. Implementation of the hardware state machine so as to perform the functions described herein will be apparent to persons skilled in the relevant art(s).

In an embodiment where the invention is implemented using software, the software may be stored in a computer program product and loaded into computer system using a removable storage drive, fixed hard drive, or communications interface. The control logic (software), when executed by the hardware, performs the functions of the invention as described herein.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., implementation of SLE within hardware other than routers, within networks using protocols other than TCP/IP, within non-satellite IP networks, other modes of operation, etc.). Thus, the present invention should not be limited by any of the above-described exemplary embodiments.

In addition, it should be understood that the figures illustrated in the attachments, which highlight the functionality and advantages of the present invention, are presented for example purposes only. The architecture of the present invention is sufficiently flexible and configurable, such that it may be utilized in ways other than that shown in the accompanying figures.

What is claimed is:

1. A method of providing secure network communication over a network between a first and a second entity, said method comprising the steps of:
   establishing a communication link between the first and second entities;
   initializing a communication session between the first and second entities via the communication link, wherein encryption command information for the communication session is exchanged;
   encrypting at least a portion of each of a plurality of data payloads from a corresponding plurality of selected protocol layers contained in each of a plurality of data packets transferred during the communication session, at least one protocol layer in each of the plurality of data packets not being selected for encryption, wherein each of the plurality of encrypted data payloads is encrypted according to the encryption command information exchanged during the initializing step; and
   shifting part of each of the plurality of encrypted data payloads to a corresponding options field in a protocol header.

2. The method of providing secure network communication as defined in claim 1, wherein the encryption command information is transmitted within the options field of a protocol header.

3. The method of providing secure network communication as defined in claim 2, further comprising:
   mapping a first address relating to the first entity and a second address relating to the second entity, wherein the first and second entities map the respective first and second addresses to respective first and second public addresses.

4. The method of providing secure network communication as defined in claim 3, wherein at least one of the first and second entities and respective first and second addresses is private.

5. The method of providing secure network communication as defined in claim 2, wherein the exchange of encryption protocols includes the exchange of encryption keys.

6. The method of providing secure network communication as defined in claim 2, wherein each of the plurality of encrypted data packets contains at least one unencrypted protocol header.

7. The method of providing secure network communication as defined in claim 2, wherein each of the plurality of encrypted data payloads is encrypted using IPsec format or an encryption algorithm that does not result in an increase in size of each of the plurality of encrypted payloads.

8. The method of providing secure network communication as defined in claim 2, wherein the network comprises mixed satellite, terrestrial, and wireless communications.

9. The method of providing secure network communication as defined in claim 2, wherein each of the plurality of encrypted data packets contains at least one unencrypted protocol header that may be read by a plurality of performance enhancement proxies.

10. A method of providing secure network communication over a network between a first and a second entity, wherein both first and second entities have respective first and second selective layer encryption devices, said method comprising the steps of:
   sending a plurality of data packets between the first entity and the first selective layer encryption device;
   encrypting at least a portion of each of a plurality of payloads carried by selected protocol layers of the plurality of data packets, said encrypting occurring at the site of the first selective layer encryption device, at least one protocol layer of each of the plurality of data packets not being selected for encryption;
   embedding an encryption command information into a plurality of protocol headers carried by the plurality of data packets;
   transmitting each of the plurality of encrypted data packets from the first selective layer encryption device to the second selective layer encryption device;
   extracting the encryption command information from the plurality of protocol headers, said extraction occurring at the site of the second selective layer encryption device; and
   shifting a first portion of each of the plurality of encrypted payloads to each of the plurality of protocol headers.

11. The method of providing secure network communication as defined in claim 10, wherein the encrypting step further comprises inserting an authentication header or trailer into each of the plurality of encrypted payloads.

12. The method of providing secure network communication as defined in claim 11, wherein a combination of a remaining second portion of each of the plurality of encrypted payloads and the authentication trailer do not exceed an original size of each of the corresponding plurality of unencrypted payloads.

13. The method of providing secure network communication as defined in claim 12, wherein the encryption command information and the first portion of each of the plurality of encrypted payloads is carried in an options field.

14. The method of providing secure network communication as defined in claim 13, wherein the options field is a TCP options field.

15. The method of providing secure network communication as defined in claim 13, wherein the options field is an IP options field.

16. The method of providing secure network communication as defined in claim 10, wherein the network comprises mixed satellite, terrestrial, and wireless communications.

17. The method of providing secure network communication as defined in claim 10, wherein each of the plurality of encrypted data packets contains at least one unencrypted protocol header that may be read by a plurality of performance enhancement proxies.

18. A system for providing secure network communication over a network, comprising:
   a first and a second computer entity, the first entity configured to initialize a communication session between the first and second entities and to exchange encryption command information once per communication session, wherein the first entity is configured to encrypt at least a portion of each of a plurality of data payloads contained in a user-selected plurality of protocol layers in a plurality of data packets according to the encryption command information, at least one layer in each data packet not being selected for encryption, and to shift part of each of the plurality of encrypted data payloads to a corresponding options field in a protocol header.

19. The system for providing secure network communication as defined in claim 18, wherein the network comprises mixed satellite, terrestrial, and wireless communications.

20. The system for providing secure network communication as defined in claim 18, wherein the first entity embeds the exchanged encryption control information into a protocol header.

21. The system for providing secure network communication as defined in claim 20, wherein the first and second entities are configured to map a first address relating to the first entity and a second address relating to the second entity to respective first and second public addresses.

22. The system for providing secure network communication as defined in claim 21, wherein at least one of the first and second entities and respective first and second addresses is private.

23. The system for providing secure network communication as defined in claim 20, wherein the first and second entities exchange encryption keys.

24. The system for providing secure network communication as defined in claim 20, wherein each of the plurality of encrypted data packets contains at least one unencrypted protocol header.

25. The system for providing secure network communication as defined in claim 20, wherein each of the plurality of encrypted data payloads is encrypted using IPsec format or an encryption algorithm that does not result in an increase in size of each of the plurality of encrypted payloads.

26. The system for providing secure network communication as defined in claim 20, wherein each of the plurality of encrypted data packets contains at least one unencrypted protocol header that may be read by a plurality of performance enhancement proxies.

27. A system for providing secure network communication over a network, comprising:
   a first and a second computer entity; and,
   a first and a second selective layer encryption device, wherein the first selective layer encryption device is configured to encrypt at least a portion of each of a plurality of payloads carried by a user-selected plurality of protocol layers in a plurality of data packets, embed an encryption command information into a plurality of protocol headers carried by the corresponding plurality of data packets, at least one layer in each of the data packets not being selected for encryption, and shift a first portion of each of the plurality of encrypted payloads to each of the plurality of protocol headers.

28. The system for providing secure network communication as defined in claim 27, wherein the first selective layer encryption device is further configured to insert an authentication header or trailer into each of the plurality of encrypted payloads.

29. The system for providing secure network communication as defined in claim 28, wherein a combination of a remaining second portion of each of the plurality of encrypted payloads and the authentication trailer do not exceed an original size of each of the corresponding plurality of unencrypted payloads.

30. The system for providing secure network communication as defined in claim 29, wherein the encryption command information and the first portion of each of the plurality of encrypted payloads is carried in an options field.

31. The system for providing secure network communication as defined in claim 30, wherein the options field is a TCP options field.

32. The system for providing secure network communication as defined in claim 30, wherein the options field is a IP options field.

33. The system for providing secure network communication as defined in claim 27, wherein the network comprises mixed satellite, terrestrial and wireless communications.

34. The system for providing secure network communication as defined in claim 27, wherein each of the plurality of protocol headers may be read by a plurality of performance enhancement proxies.

35. A computer program product executable by a computer, comprising:
a computer useable medium upon which computer program logic is recorded, the computer program logic configured to initialize a communication session by embedding encryption control information into an options field of a protocol header of an initial data packet, to encrypt at least portions of user-selected protocol layers of each of a plurality of subsequent data packets, each of the subsequent data packets including at least one protocol layer not selected for encryption, wherein each of the plurality of encrypted subsequent data packets includes encryption control information, and to shift part of each of the encrypted portions to the options field of a protocol header of the data packets.

36. The computer program product defined in claim 35, wherein the computer program logic is configured to map a first address relating to a first entity and a second address relating to a second entity to respective first and second public addresses corresponding to first and second routers.

37. The computer program product defined in claim 35, wherein the computer program logic is configured to instruct a first and a second router to exchange encryption protocol information, and wherein the exchange of encryption protocol information occurs only once during a communication session.

38. The computer program product defined in claim 35, wherein the computer program logic is configured to instruct a first and a second router to exchange encryption keys.

39. The computer program product defined in claim 35, wherein the computer program logic encrypts each of the plurality of encrypted subsequent data packets using IPsec format or an encryption algorithm that does not result in an increase in size of each of the corresponding plurality of encrypted payloads.

40. A computer program product executable by a computer, comprising:
a computer useable medium upon which computer program logic is recorded, the computer program logic configured to encrypt at least a portion of each of a plurality of data payloads within a corresponding plurality of user-selected protocol layers of a plurality of data packets, at least one protocol layer of each data packet not selected for encryption, to embed encryption control information into an options field of each of a plurality of protocol headers, and to shift a first portion of each of the plurality of encrypted payloads to each of the corresponding plurality of protocol headers.

41. The computer program as defined in claim 40, wherein the computer program logic is further configured to insert an authentication header or trailer into each of the plurality of encrypted payloads.

42. The computer program as defined in claim 41, wherein a combination of a remaining second portion of each of the plurality of encrypted payloads and the authentication trailer do not exceed an original size of each of the corresponding plurality of unencrypted payloads.

43. The computer program as defined in claim 42, wherein the computer program logic is further configured to embed the encryption command information and the first portion of each of the plurality of encrypted payloads into an options field.

44. The computer program as defined in claim 43, wherein the options field is a TCP options field.

45. The computer program as defined in claim 43, wherein the options field is an IP options field.

46. A device for providing secure network communication, configured to encrypt at least portions of selected protocol layers of each of a plurality of data packets, at least one protocol layer of each data packet not selected for encryption, wherein the device may be configured to embed encryption command information and a first portion of an encrypted payload into an options field of at least one protocol header.

47. The device for providing secure network communication as defined in claim 46, further configured to map a first address relating to a first entity and a second address relating to a second entity to respective first and second public addresses corresponding to respective first and second routers.

48. The device for providing secure network communication as defined in claim 46, further configured to instruct a first and a second router to exchange encryption protocol information, and wherein the exchange of encryption protocol information occurs only once during a communication session.

49. The device for providing secure network communication as defined in claim 46, further configured to instruct a first and a second router to exchange encryption keys.

50. The device for providing secure network communication as defined in claim 46, further configured to encrypt each of the plurality of encrypted data packets using IPsec format or an encryption algorithm that does not result in an increase in size of each of a corresponding plurality of encrypted payloads.

51. The device for providing secure network communication as defined in claim 46, wherein the device is at least one of the group consisting of a router, a satellite, a satellite base station, a cell station, and a computer.

52. The device for providing secure network communication as defined in claim 46, wherein the device is implemented by at least one of the group consisting of a router, a satellite, a satellite base station, a cell station, and a computer.

53. A device for providing secure network communication, comprising:

encryption means for selectively encrypting at least a portion of at least one of a plurality of layers of a data packet, at least one of the plurality of layers not being selected for encryption;

shifting means for shifting a portion of a data payload contained in the data packet to at least one of a plurality of protocol headers of the data packet, the shifted portion of the data payload being equal in size to an additional portion that is inserted into the data payload; and mapping means for mapping a first address to a second address.

54. The device for providing secure network communication as defined in claim 53, wherein the encryption means is configured to keep at least one of the plurality of protocol headers of the data packet in an unencrypted state.

55. The device for providing secure network communication as defined in claim 53, wherein the encryption means is configured to encrypt using IPsec format or an encryption algorithm that does not result in an increase in size of the at least one of the plurality of layers of the data packet.

56. The device for providing secure network communication as defined in claim 53, wherein the additional portion that is inserted into the data payload is an authentication header or trailer.

57. The device for providing secure network communication as defined in claim 53, wherein the first address is private.

58. The device for providing secure network communication as defined in claim 53, wherein both the first address and the second address are private.

* * * * *